May 6, 1952 — H. H. KUEFNER — 2,595,530
PLANT MARKER
Filed July 21, 1950
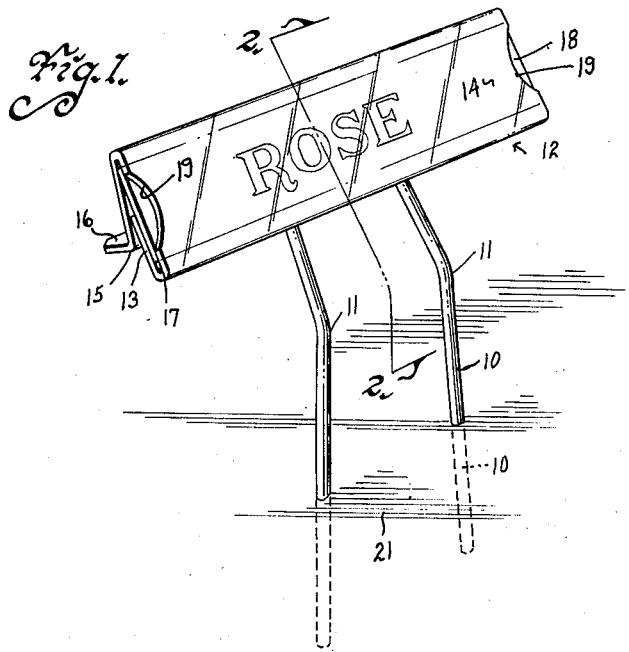
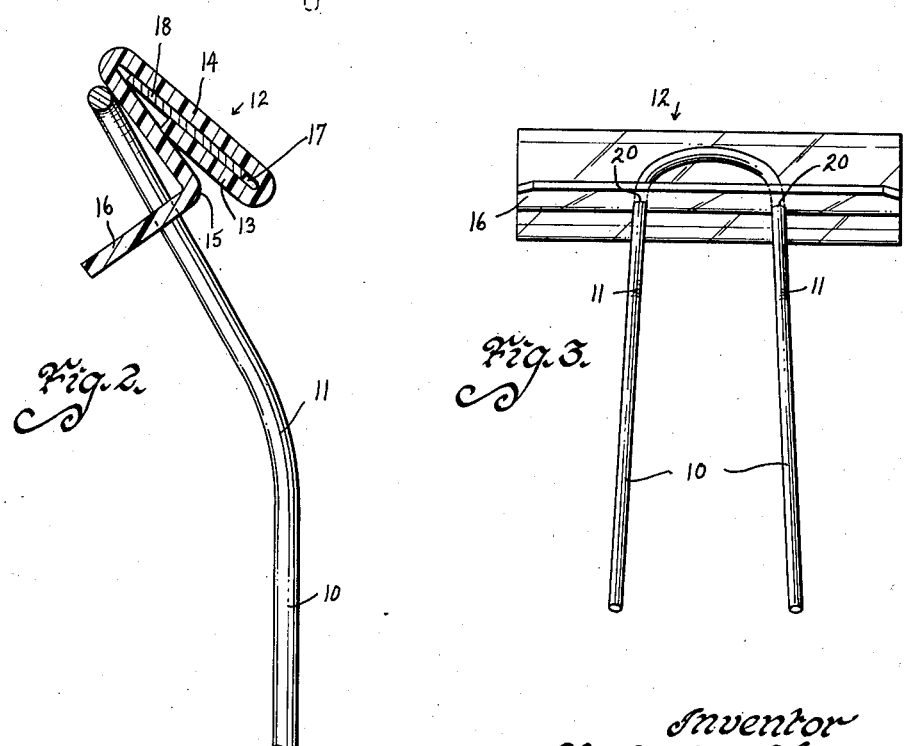
Inventor
Herbert H. Kuefner
by M. Talbert Dick
Attorney
Witness
Edward P. Seeley Patented May 6, 1952

2,595,530

UNITED STATES PATENT OFFICE 2,595,530

PLANT MARKER

Herbert H. Kuefner, Des Moines, Iowa

Application July 21, 1950, Serial No. 175,185

3 Claims. (Cl. 40—10)

My invention relates to a plant marker for use more especially in greenhouses, gardens and the like where identification for a variety of plants is desired.

In greenhouses where flowers, plants and the like are commercially produced, there are usually many varieties and species in various stages of growth. A suitable marker conspicuously placed for these different plants not only aid the producer in quick identification but is of considerable help to prospective purchasers who may be browsing among the planted rows. Such markers find utility also in private gardens and the like where a large variety of plants may be under cultivation. In an effort to fulfill the need for a marker of this type many persons merely use a wooden stake on which the identifying name is written or painted. Another type of marker used embodies a piece of flat sheet metal secured to a hairpin-like support and which also requires the name to be written or painted thereon. Neither of these markers is wholly satisfactory for several reasons. Often the name of the plant is rather long and this makes it difficult to manually transcribe on a small surface. Furthermore, these markers when out-of-doors are exposed to the elements and when indoors are of course subject to water contact when the plants are watered. This tends to dim the imprinted words and to diminish their utility and obviously the legibility of the handwriting resulting from scribbling on a small surface often leaves much to be desired.

It is therefore an object of my invention to provide a plant marker embodying a transparent member for holding identifying indicia that is detachably secured to a flexible support.

A further object of this invention is to provide a marker of the above class in which the identifying indicia can be easily and quickly inserted or removed therefrom.

More specifically my invention aims to provide an elongated hairpin-like support member designed to penetrate soil or the like and a transparent holder in which printed identifying indicia can be detachably placed, with the holder member having a flange with spaced openings whereby the free ends of the hairpin-like support can be passed therethrough and the holder remains in position by frictional contact therewith.

A still further object of my invention is to provide a plant marker having the above mentioned characteristics that is economical in manufacture, simple in construction and efficient in use.

These and other objects will be apparent to those skilled in the art.

My invention consists in the construction, arrangement, and combination of the various parts of the device, whereby the objects contemplated are attained as hereinafter more fully set forth, pointed out in my claims, and illustrated in the accompanying drawings, in which:

Fig. 1 is a perspective view of my marker shown supported in a bed of soil or the like, Fig. 2 is a cross-sectional view of this device taken on the line 2—2 of Fig. 1, and Fig. 3 is a back elevational view of this marker.

Referring to the drawings I have used the numeral 10 to designate the marker supporting member formed from an elongated resilient rod that is bent at its center into a U-shape with the resulting two rod lengths extending first forwardly and downwardly and slightly away from each other to the bend points 11 and then downwardly and slightly away from each other as shown in the drawings. Thus formed this member 10 has substantially a hairpin-like shape with its upper portion bent backwardly at a slight angle. The indica holder indicated at 12 is made from a transparent material such as plastic or the like and consists of an elongated rectangular strip that has one end portion 13 bent under and back upon itself so that it is substantially parallel and spaced from the face portion 14 of the holder as shown in Fig. 2. The other end of the holder is bent under and back upon itself so that it overlaps the free end of the portion 13 and extends to the bend point 15. From there it is bent to extend outwardly therefrom at preferably slightly less than a right angle to form the flange 16 as illustrated in Fig. 2. By this arrangement a slot or chamber 17 is provided in which a card or the like 18 bearing identifying indicia such as I have illustrated by the word Rose can be manually inserted. Finger grip cut out portions 19 are provided on opposite ends of the face portion 14 to facilitate gripping the card 18.

In the center portion of the flange 16 there are two spaced openings 20 extending transversely therethrough as shown in Fig. 3. It is pointed out that preferably these openings are not perpendicular to the top and bottom surfaces of the flange but are on a slight angle extending from the bottom of the flange towards the main portion of the holder 12 as can be seen in Fig. 2.

The holder 12 is mounted by passing the free ends of the supporting member 10 through the respective openings 20 and sliding the holder above the bend points 11 until the back of the top portion of the holder engages the U-portion of the support member as shown in Fig. 2. Normally, the spaced relation of the openings or holes 20 will be such that the ends of the rod support 10 will have to be drawn towards each other in order to pass therethrough. Consequently the tendency of the rod lengths to move away from each other will create friction to keep the holder from sliding downwardly. The bend points 11 also provide a stop means against unintentional slipping of the holder. Still a further friction means for maintaining the holder in place is the angled position of the openings 20 whereby the top back portion of the holder 12 is obviously drawn against the U-portion of the rod support 10. This latter arrangement thus gives a three point support for the holder.

In use, the free ends of the support rod 10 are merely inserted in soil 21 or the like and the indicia on the card 18 is for all practical purposes protected from the elements. The indicia is preferably printed which can be inexpensively done and thus it is legible irrespective of the length of the identification required. The cards 18 are easily exchangeable so that one marker can be used indefinitely.

It is further pointed out in the use of this marker that there may be times when its manner of use will not require the wire holder. This would be true if the marker were to be placed upon a counter or table where flowers are to be sold and it was desirable to have them identified. For this purpose the flange 16 serves as a base member for supporting the holder on a flat surface in such a manner that the indicia placed therein can be readily seen.

Some changes may be made in the construction and arrangement of my plant marker without departing from the real spirit and purpose of my invention, and it is my intention to cover by my claims, any modified forms of structure or use of mechanical equivalents which may be reasonably included within their scope.

I claim:

1. In a plant marker, a hairpin shaped rod support member having its upper portion bent slightly backwardly, an indicia holder comprising, a length of transparent solid material having one end portion bent under and back upon but not touching itself, its other end portion bent first under and back so as to overlap said first mentioned end portion and then extending outwardly to form a flange, two spaced openings extending transversely through said flange and the free ends of said rod support member extending through said respective openings to a point whereby said indicia holder is supported thereon at its upper portion.

2. In a plant marker, a hairpin shaped rod support member having its upper portion bent slightly backwardly, an indicia holder comprising, a length of transparent solid material having one end portion bent under and back upon but not touching itself, its other end portion bent first under and back so as to overlap said first mentioned end portion and then extending outwardly therefrom to form a flange, two spaced openings extending at an angle transversely through said flange and the free ends of said rod support member extending through said respective openings to a point whereby said indicia holder is supported thereon at its upper portion so that the top of the back of said indicia holder frictionally engages the top portion of said rod support member.

3. A plant marker as defined in claim 1 characterized by a cut away portion at one end of said indicia holder designed to facilitate the manual gripping of indicia placed therein.

HERBERT H. KUEFNER.

REFERENCES CITED

The following references are of record in the file of this patent:

UNITED STATES PATENTS

| Number | Name | Date |
|---|---|---|
| 1,294,948 | Rand | Feb. 18, 1919 |
| 1,625,154 | Rand | Apr. 19, 1927 |
| 2,048,906 | Webster | July 28, 1936 |
| 2,328,807 | Hoofer | Sept. 7, 1943 |
| 2,409,814 | Vargish | Oct. 22, 1946 |
| 2,547,239 | Walker | Apr. 3, 1951 |